United States Patent [19]
Fehr et al.

[11] Patent Number: 4,649,927
[45] Date of Patent: Mar. 17, 1987

[54] REAL TIME DISPLAY OF AN ULTRASONIC COMPOUND IMAGE

[75] Inventors: Rainer Fehr, Hofstetten; Pierre-André Grandchamp, Münchenstein; Peter Krummenacher, Gipf-Oberfrick, all of Switzerland

[73] Assignee: Kontron Holding AG, Zurich, Switzerland

[21] Appl. No.: 779,186

[22] Filed: Sep. 23, 1985

[30] Foreign Application Priority Data

Sep. 25, 1984 [CH] Switzerland ......................... 4576/84

[51] Int. Cl.⁴ ............................................. A61B 10/00
[52] U.S. Cl. .................................. 128/660; 358/112
[58] Field of Search ............... 128/660–661; 73/625–626

[56] References Cited

U.S. PATENT DOCUMENTS

| 4,159,462 | 6/1979 | Rocha et al. | 367/97 |
| 4,231,373 | 11/1980 | Waxman et al. | 128/660 |
| 4,287,767 | 9/1981 | Kretz | 128/660 X |
| 4,319,489 | 3/1982 | Yamaguchi et al. | 73/626 |
| 4,431,007 | 2/1984 | Amazeen et al. | 128/660 |
| 4,443,862 | 4/1984 | Buchner et al. | 128/660 X |
| 4,463,763 | 8/1984 | Koyano et al. | 128/661 |
| 4,567,897 | 2/1986 | Endo et al. | 128/660 |

FOREIGN PATENT DOCUMENTS 504192 4/1978 Australia .
2811699 9/1979 Fed. Rep. of Germany .
3124655 1/1983 Fed. Rep. of Germany .
3308995 9/1984 Fed. Rep. of Germany .
2531783 2/1984 France .

OTHER PUBLICATIONS

Fidel, H. F. "Parallel Processing of Simultaneous Ultrasound Vectors", Europ. Pat. Appln. 0 123 411, publ. Oct. 31, 1984.
Shattuck et al., Ultrasonic Imaging 4:93–107 (1982).

Primary Examiner—Kyle L. Howell
Assistant Examiner—Francis J. Jaworski
Attorney, Agent, or Firm—Jon S. Saxe; Bernard S. Leon; George W. Johnston

[57] ABSTRACT

A method and apparatus for producing a compound ultrasound cross-sectional picture of a body, in which method a plurality of partially overlapping body scans are carried out line-wise by the pulse-echo method in one scanning plane, thereby producing image signals in digital form corresponding to the received echoes. For the real-time display of the compound cross-sectional pictures, the set of image signals produced with each scan is stored in a separate digital storage unit, at least some of the stored sets of image signals are immediately combined with one another to generate a new set of image signals corresponding to a compound real-time cross-sectional picture, and the new set of image signals is immediately fed to a television monitor in order to display the compound real-time cross-sectional picture.

15 Claims, 20 Drawing Figures

REAL TIME DISPLAY OF AN ULTRASONIC COMPOUND IMAGE

TECHNICAL FIELD

The invention relates to methods and apparatus for producing a compound ultrasound cross-sectional picture of a body, in which a plurality of partially overlapping body scans are carried out line-wise by the pulse-echo method in one scanning plane, thereby producing image signals in digital form corresponding to the received echoes.

PRIOR ART

Methods and apparatus of the above kind are known in the prior art. See, e.g., D. P. Shattuck and P. T. vom Ramm, Ultrasonic Imaging 4, 1982, pages 93-107. The technique is carried out with a system using a phased array of ultrasound transducers and controlled by a central control unit. A plurality of partially overlapping sector scans are executed in rapid sequence with the transducer array. The result is what is known as a real-time compound scan. The ultrasound cross-sectional picture produced with each sector scan is displayed on an oscilloscope connected to the transducer array via an echo signal receiver. In this way, a real-time compound picture is produced on the screen of the oscilloscope simply by superimposing the images produced by a plurality of sector scans. However, the quality of this picture is so poor that reliable medical diagnosis is impossible. This poor picture quality is due mainly to fluctuations in the brightness of the compound picture points. Their brightness varies with time and also with their location within the image.

The fluctuations of the brightness of the image points with time are due to the fact that the sector scans are carried out in succession. The local brightness fluctuations are due to the superimposition of partially overlapping sector scans.

In order to produce in this known method a compound image of usable quality, each of the pictures displayed on the oscilloscope is photographed by a video camera and initially stored in a video recorder. In order to produce a compound picture the image signals of four of the successively stored images are combined with one another. This is carried out in a computer connected to the video recorder. An image signal corresponding to the mean value of corresponding image signals of the images produced by the individual sector scans is produced by the computer for each compound image point. The resultant image signals are stored by means of the video recorder and displayed on a television monitor screen as required. A considerable disadvantage of this known technique is that it does not allow real-time display of the compound picture and hence no real-time display of movements.

The aim of the invention, therefore, is to provide ultrasound imaging apparatus and methods which generate a real-time display of compound ultrasound cross-sectional pictures of good quality.

SUMMARY OF THE INVENTION

According to the invention, this aim is achieved by a method and apparatus in which:

(a) the set of image signals produced with each scan is stored in a separate digital storage unit, (b) at least some of the stored sets of image signals are immediately combined with one another to generate a new set of image signals corresponding to a compound real-time cross-sectional picture, and (c) the new set of image signals is immediately fed to a television monitor to display the compound real-time cross-sectional picture.

The invention also relates to an image signal processing unit for use in an ultrasound imaging system for producing ultrasound cross-sectional pictures of a body, with the system carrying out in line-wise fashion in one scanning plane, a plurality of partially overlapping body scans utilizing the pulse echo process. The system produces image signals in digital form corresponding to the received echoes, and to this end includes an ultrasound scanner, a transceiver unit connected thereto, a television monitor, a transducer connector system, a control unit connected to the transceiver unit, to the transducer connector system and to the television monitor. The image signal processing unit is connected between the transceiver unit and the television monitor and comprises:

(a) a digital image signal memory connected to the transceiver unit and comprising a main memory subdivided into a plurality of memory units, each memory unit having a data input and a data output and a memory capacity sufficient to accommodate a set of image signals corresponding to a picture producible by a single one of the imaging system scans, (b) an evaluator connected between the image signal memory and the television monitor to combine immediately with one another at least certain of the image signals stored in the image signal memory so as to produce a new set of image signals corresponding to a compound real-time cross-sectional picture of the body, and (c) electrical connecting means by means of which the image signal memory and the evaluator are adapted to be connected to the imaging system control unit.

The invention also relates to an ultrasound imaging apparatus for producing cross-sectional pictures of a body comprising an ultrasound scanner, a transceiver unit connected thereto, a television monitor, a transducer connector system, a control unit connected to the transceiver unit, the transducer connector and the television monitor, which apparatus includes the above-described image signal processing unit.

A most important advantage obtained with the invention is that it allows real-time display of ultrasound cross-sectional pictures of good quality and hence real time display of movements, e.g. those occurring during the examination of abdominal organs. It is also advantageous that the invention achieves this with relatively little circuitry.

As will be described below in detail, the image signal processing unit according to the invention is usable in an ultrasound imaging system operating with a phased array of ultrasound transducers. It is also suitable for use in ultrasound imaging systems operating with a mechanically driven transducer system. In this connection, reference should be made, in connection with the present description, to the concurrently filed Patent Applications No. 779,189 entitled "Ultrasonic Compound Scan with an Oscillating Transducer" and No. 779,187 entitled "Ultrasonic Compound Scan with a Rotating Transducer". Both of these applications are commonly owned with the instant application.

Further features and advantages of the invention will be apparent from the following description of exemplary embodiments. These we illustrated in the accompanying drawings wherein:

BRIEF DESCRIPTION OF THE DRAWINGS

FIG. 8 is a block diagram of the array 35 of output buffer memories 351-358 and of the evaluator 36 in FIG. 4, FIG. 9 schematically illustrates scans at different directional angles.

DETAILED DESCRIPTION OF THE PREFERRED EMBODIMENT

Figure 1:
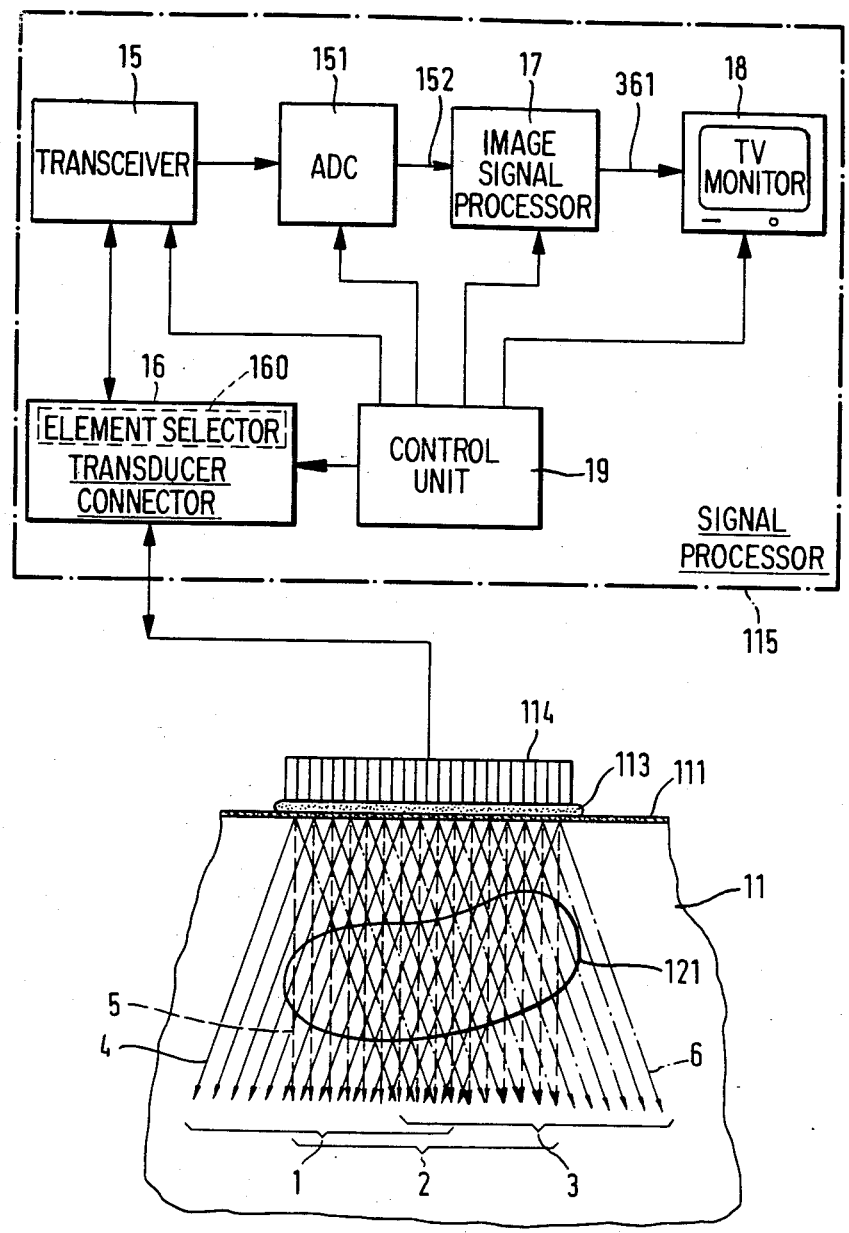
FIG. 1 is a block diagram of an ultrasound imaging system containing an image signal processing unit 17 according to the invention.

FIG. 1 is a block diagram diagrammatically illustrating an ultrasound imaging system for performing the method according to the invention. This system includes as main components, an ultrasound transducer array 114 and a signal processing unit 115.

Figure 2:
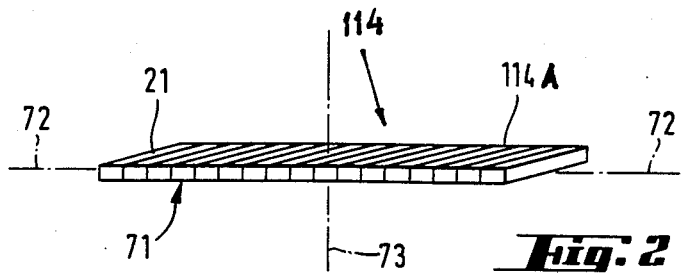
FIGS. 2 and 3 show two embodiments of the ultrasound transducer array 114 of FIG. 1.

In the embodiment of FIG. 2, the transducer array 114 comprises an elongate array 114A of adjacent transducer elements, 21. The array has an emission surface 71 with an axis of symmetry 72 extending parallel to the array's longitudinal axis and an axis 73 extending perpendicularly to and through the center of the emission surface 71. Axes 72 and 73 define the scanning plane scanned by the transducer array 114.

Figure 3:
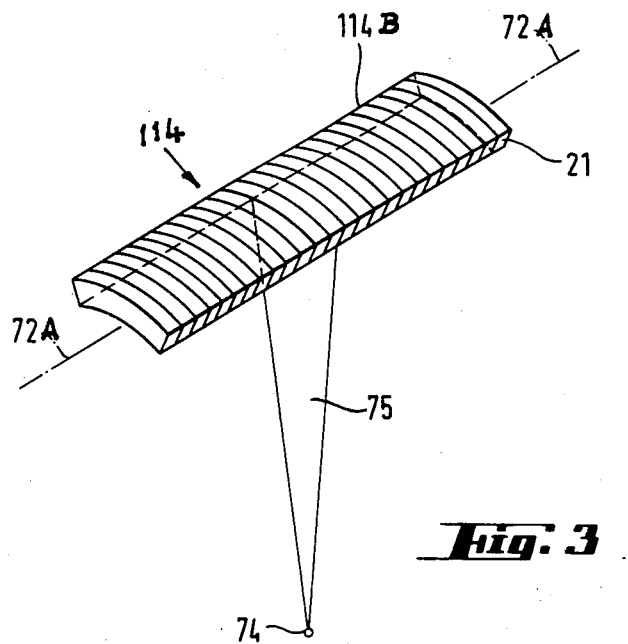

As shown in FIG. 2, the transducer array may have a flat emission surface 71. However, in the preferred embodiment, shown in FIG. 3, the array 114B has a certain curvature which provides focusing of the ultrasound waves in a plane perpendicular to the scanning plane (the latter contains the axis 72A and the focal point 74). This focusing is depicted in FIG. 3 by the diagrammatic representation of an ultrasound beam 75 focused approximately at the focal point 74.

The signal processing unit 115 shown in FIG. 1 comprises a transceiver unit 15, and analog-digital converter 151, a transducer connector 16, an image signal processing unit 17, a television monitor 18, and a central control unit 19.

The ultrasound imaging system shown in FIG. 1 operates with the segmented transducer array 114 whose transducer elements are actuated in groups to carry out a plurality of scans at different directional angles. Accordingly, the transducer connector 16 contains an element selector 160 by means of which the transducer elements of the array 114 can be optionally connected to corresponding terminals of the transceiver unit.

The analog-digital converter 151 of FIG. 1 digitizes the echo signals received with the transceiver unit and supplies them to the image signal processing unit 17 via data path 152. The resultant compound image signals at the output of the processing unit are fed to the television monitor 18 via path 361.

The lower section of FIG. 1 diagrammatically illustrates the use of the imaging system in the examination of a section 11 of the body of a patient. As shown in this Figure, the transducer array 114 is applied to the skin 111 covering the body section 11 under examination, a transmission gel 113 being applied between the transducer array emission surface and the patient's skin.

To produce a compound cross-sectional picture, e.g. of an internal organ such as 121, the imaging system shown in FIG. 1 is so operated that at least 2 different partially overlapping scans are carried out in the scanning plane by the pulse echo process using the transducer array 114. For example, 3 scans 1, 2, 3 are carried out consecutively in rapid sequence. During each of these scans, groups of transducer elements of the array 114 are used in rapid sequence to emit ultrasound pulses in a given direction and to receive the corresponding echoes. In this way the body region under examination is subjected to ultrasound during each scan with a rapid sequence of parallel ultrasound pulses. In FIG. 1, the beams corresponding to each of the scans 1, 2, 3 (also referred to as scanning lines) are symbolized by the different lines 4, 5 and 6. With the method described, the part of the body under examination is irradiated with ultrasound in a very short time using the compound scanning pattern shown in FIG. 1.

The transceiver unit 15 of FIG. 1 produces the transmission signals for the transducer elements of the array 114 and receives the echo signals delivered by these elements. The echo signals are then supplied to the A to D converter 151 and after digitizing appear at the A to D output 152. For further details of the construction and function of the transceiver unit 15 reference may be had to the European Patent Application published under No. 0 150 452, corresponding to Patent Application No. 695 768/85 filed on Jan. 28, 1985, in the USA.

With respect to the element selector 160 of FIG. 1, that unit is connected between the transceiver unit 15 and the transducer array 114 to select successively different groups of adjacent elements in the transducer array and to electrically connect the elements of each selected group to the transceiver unit.

Individual pictures are built up by the different scans 1, 2, 3 shown in FIG. 1. The image signal processing unit 17 described in detail hereinafter is intended to provide electronic compounding, i.e. assembly, of these individual pictures to give a compound picture. For this purpose, unit 17 comprises means for the storage and association of the image signals delivered by the transceiver unit, and means for transmitting the resulting image signals, corresponding to the compound picture, to the television monitor 18.

The television monitor 18 displays the resultant picture.

The control unit 19 incorporates the means required to control the function of the transducer connector 16, the element selector 160 contained therein, the transceiver unit 15, the image signal processing unit 17 and the television monitor 18.

Figure 4:
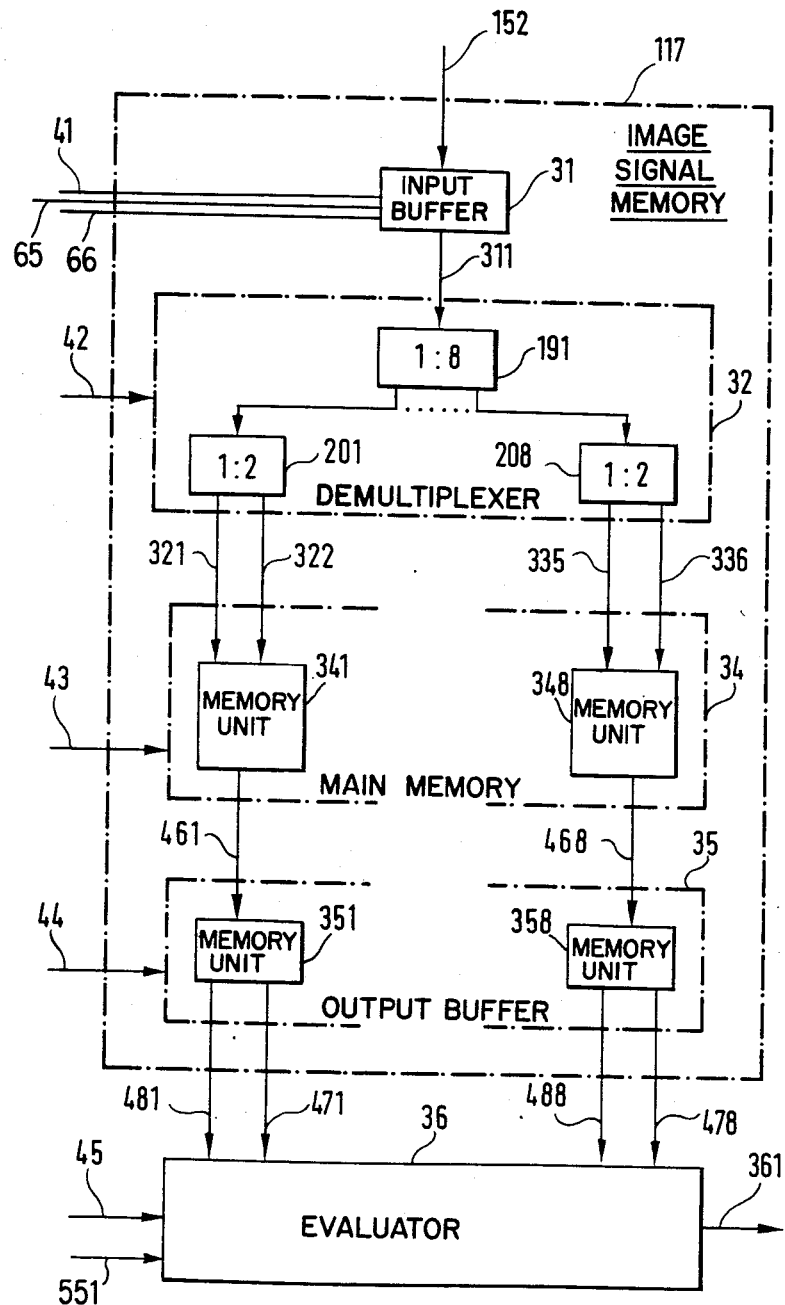
FIG. 4 is a block diagram of the image signal processing unit 17 shown in FIG. 1.

FIG. 4 is a block diagram of the image signal processing unit 17 of FIG. 1. This unit comprises a digital image signal memory 117 and an evaluator 36.

The image signal memory 117 comprises in turn an input buffer memory 31, a demultiplexer 32, a main memory 34 containing eight memory units 341-348, and an array 35 of eight output buffer memories 351-358, one of which is allotted to each of the memory units 341-348.

The demultiplexer 32 comprises a demultiplexer 191 having a demultiplexer ratio of 1:8 and eight demultiplexers 201-208 each having a demultiplex ratio of 1:2 and each being connected to one output of the demultiplexer 191.

Memory addressing and related functions for the writing and reading operations in the main memory 34 are supplied by the control unit 19 (FIG. 1).

The input to the input buffer memory 31 is supplied via lead 152 from the output of the analog-digital converter 151 in FIG. 1 while its output is connected to the input of the demultiplexer 32 via a lead 311. The outputs of the demultiplexer 32 are connected via eight pair of leads 321-336 to corresponding inputs of the memory units 341-348. The latter supply the output buffer memories 351-358, the outputs of which are connected via lead pairs 471, 481; 472, 482 . . . 478, 488, to assigned inputs of the evaluator unit 36. The output of this unit is connected via lead 361 to the input of the television monitor 18 in FIG. 1. Control signals delivered by the control unit 19 are fed to the circuits in FIG. 4 via leads 41-45,65, 66, 551. (It should be noted that "leads" can refer to both single and multiple conductor paths.)

Figure 5:
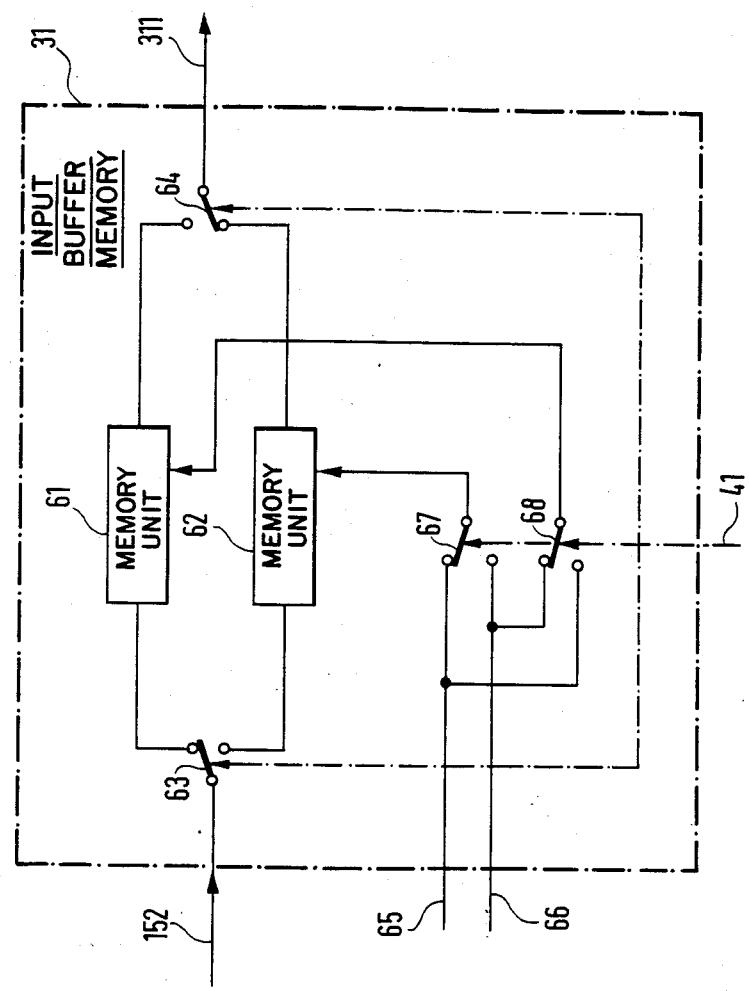
FIG. 5 is a block diagram of the input buffer memory 31 in FIG. 4.

FIG. 5 is a block diagram of the input buffer memory 31 shown originally in FIG. 4. This buffer memory comprises two identical memory units 61, 62 each having a storage capacity of 512×6 bits. Each of these memory units serves to store all the image signals corresponding to one scanning line, e.g. scanning line 4 in FIG. 1.

Switches 63, 64 enable image signals (digitized amplitude values) arriving within an interval of 256 microseconds (beam repetition time) over line 152 to be written into one of the memory units 61, 62 and stored image signals of the immediately preceding scanning line to be read out of the other one of these memory units during the same interval and fed to the multiplexer 32 via the lead 311. The input buffer receives a clock signal for controlling the writing operation by way of the line 66 and a clock signal for controlling the reading operation via the line 65. These clock pulses are fed to the memory units 61, 62 via switches 67, 68. On completion of the read-out operation from one of the memory units 61, 62, the switches 63, 64, 67, 68 change state under control of the control unit 19 as signified by the line 41.

Figure 6:
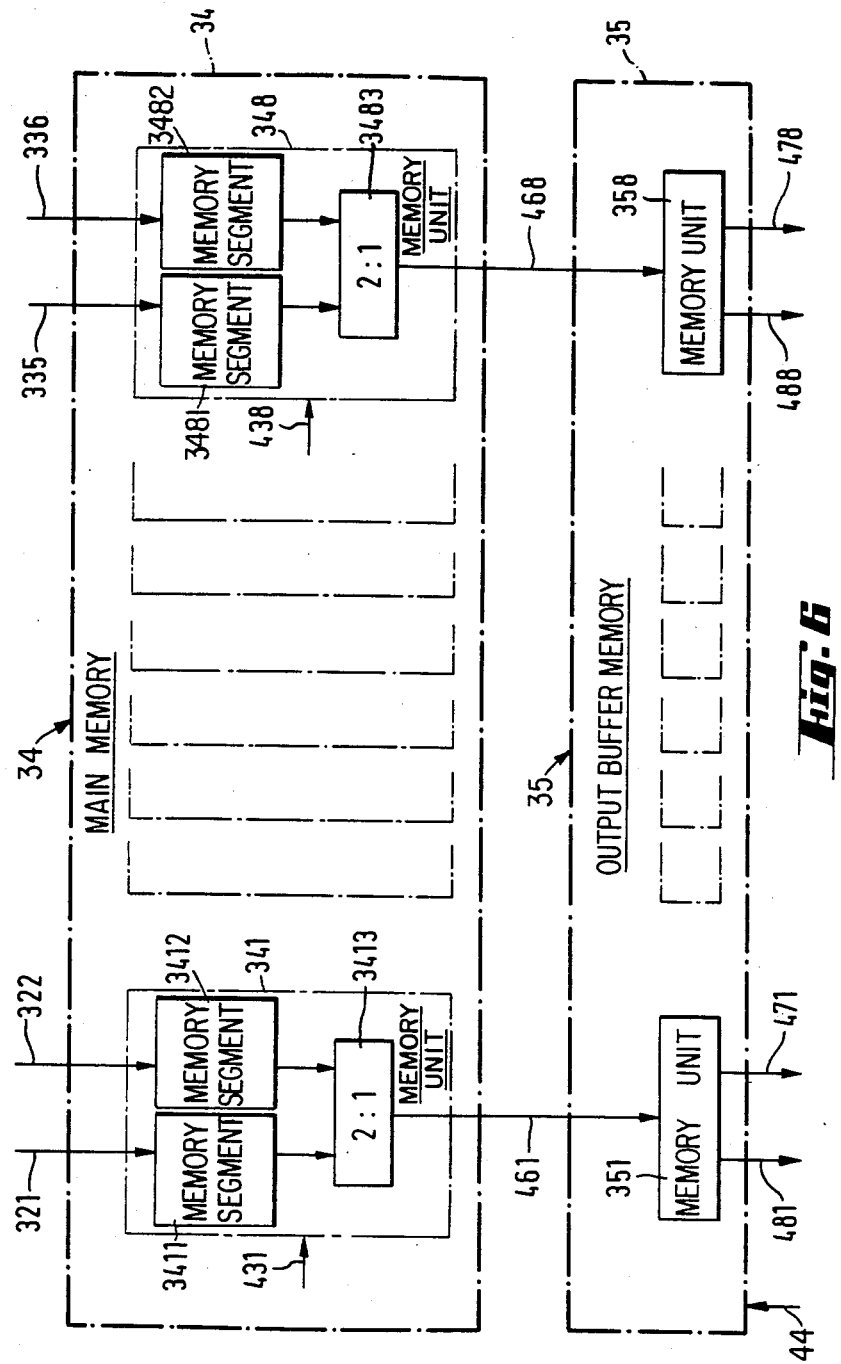
FIG. 6 is a block diagram of the main memory 34 and of the array 35 of output buffer memories 351-358 in FIG. 4.

FIG. 6 is a block diagram of the main memory 34 and the array 35 of output buffer memories 351-358. As shown diagrammatically in FIG. 6, each of the eight memory units 341-348 is subdivided into memory sub-levels. For example, memory unit 341 is divided into two sub-levels 3411 and 3412. Each of these sub-levels has a storage capacity of 64×256 pixels. Thus each of the memory units 341-348 has a net storage capacity of 64×512 pixels. As described below in detail, all the image signals obtained from one scan consisting of a sequence of 64 scanning lines are stored in each of the memory units 341-348. A television-compatible display of the picture information obtained on each scan would in this example consist of 512 television lines. The main memory 34 is so organized that for each scan the image signals for the even-numbered lines of the television picture are stored in one sub-level of one of the memory units and the image signals for the odd-numbered lines are stored in the other sub-level of the same memory unit. Each of the eight memory units 341-348 contains one of the multiplexers 3413-3483. The image signals stored in the sub-levels of the memory units are fed to the inputs of the output buffer memories 351-358 via these multiplexers and via the lines 461-468.

Figure 7:
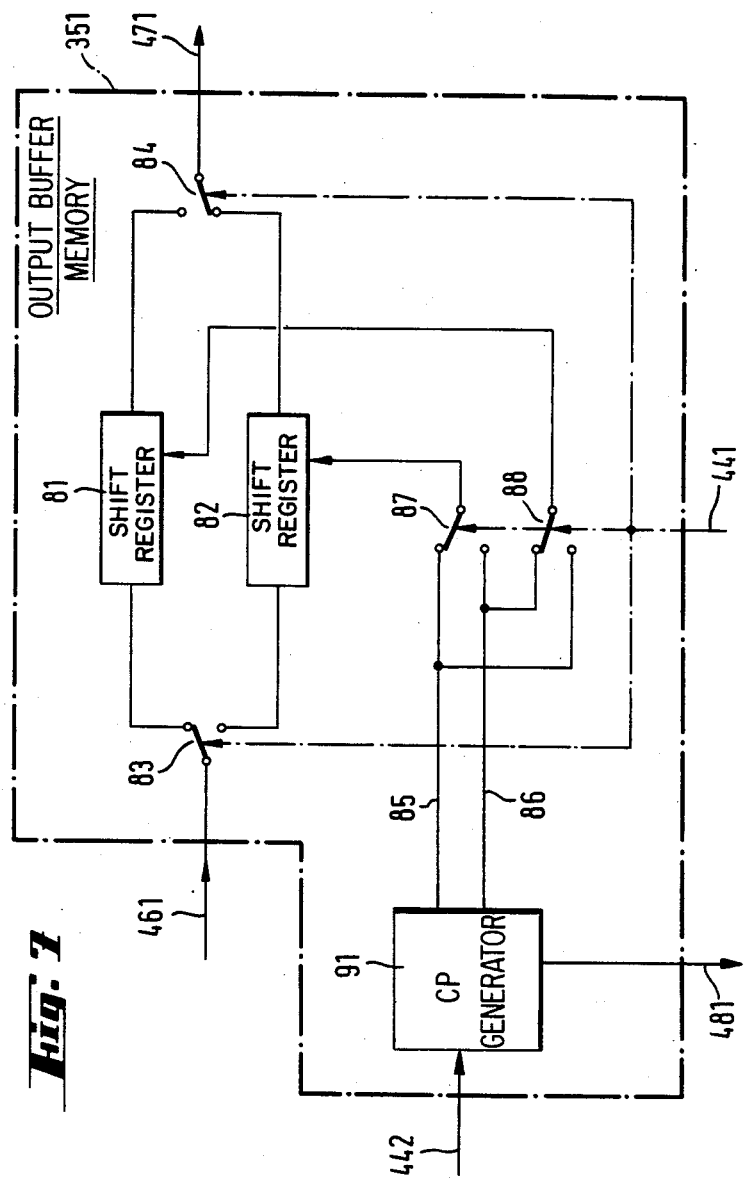
FIG. 7 is a block diagram of the output buffer memory 351 of the array 35 in FIG. 6.
Figure 6:
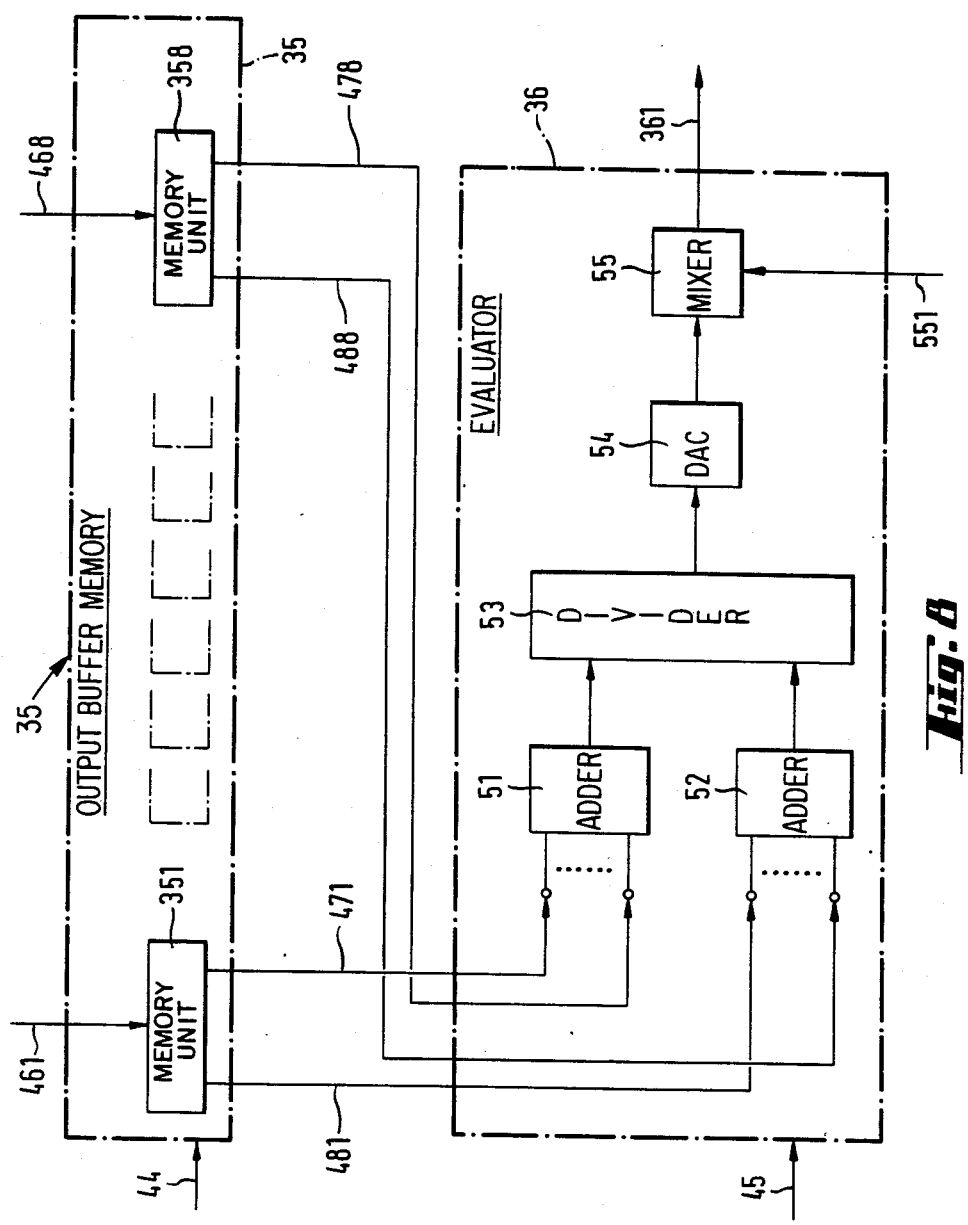

FIG. 7 is a block diagram of the output buffer memory 351 of the arrangement shown in FIG. 6. All eight output buffer memories 351-358 have the same construction. The output buffer memory 351 comprises two identical shift registers 81, 82 each having a storage capacity of 64×6 bits. The image signals for a complete line of a television picture produced with one scan are stored in each of these shift registers. By means of switches 83, 84 it is possible to write into one of the shift registers 81, 82 the image signals for a television line delivered by the main memory 34 via line 461, while the image signals stored in the other shift register for the preceding television line are read out of the memory and fed via switch 84 and line 471 to the evaluator 36. The output buffer memory 351 also comprises a programmable clock pulse generator 91 which receives control signals from the control unit 19 via a line 442 and delivers the following signals: read enabling pulses via line 481, a clock signal for controlling the writing operation via a line 86 and a clock signal for controlling the read operation via a line 85. The clock signals delivered via lines 85, 86 are fed to the shift registers 81, 82 via switches 87, 88. On completion of the writing operation in one of the shift registers 81, 82 the switches 83, 84, 87, 88 change state in response to the control unit 19 as signified by line 441 in FIG. 7.

FIG. 8 is a block diagram of the array 35 of the output buffer memories 351-358 and of the evaluator 36. The latter comprises two adding circuits 51, 52, a quotient forming circuit 53, a digital-analog converter 54 and a mixer circuit 55. Image signals delivered by the output buffer memories 351-358 via lines 471-478 are added by means of the adding circuit 51 and the corresponding summation signal is fed to a first input of the quotient forming circuit 53. Read enabling pulses delivered via lines 481-488 are added by the adding circuit 52 and the corresponding summation signal is fed to a second input of the quotient forming circuit 53. This circuit forms an output signal corresponding to the quotient of the summation signal at the output of the adding circuit 51 divided by the summation signal at the output of the adding circuit 52. The output signal of the quotient forming circuit 53 is converted by the digital-analog converter 54 into a corresponding analog signal which is fed to one of the inputs of the mixer circuit 55. There it is mixed with a television synchronization signal fed via line 551 to a second input of the mixer circuit 55, to form the output signal of the evaluator 36. The latter is then fed to the television monitor via the line 361.

Figure 9:
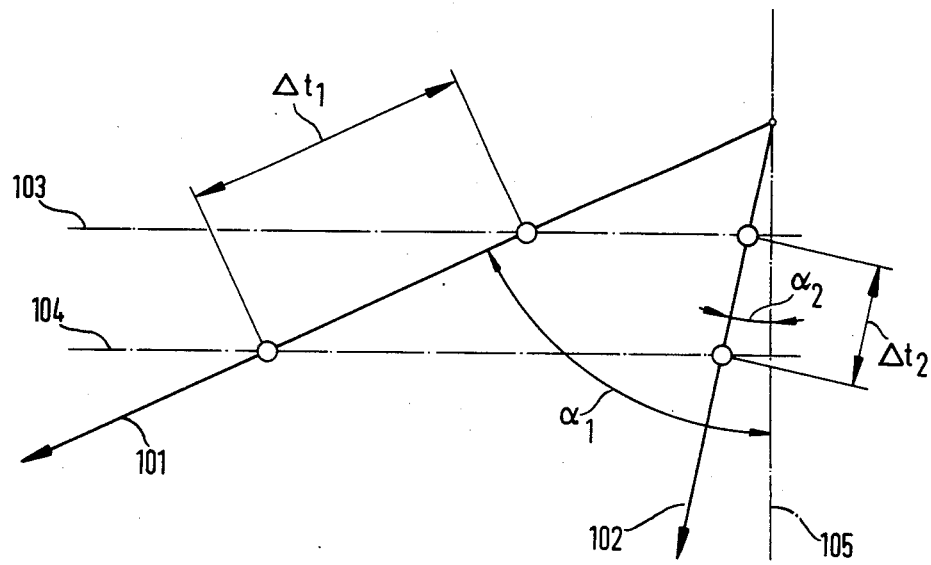

FIG. 9 shows two ultrasound beams 101, 102, which in the scanning plane form different angles $\alpha_1$ and $\alpha_2$ with an axis 105 perpendicular to the emission surface. These ultrasound beams cover scanned zones which in FIG. 9 are denoted by small circles and are contained in layers 103 and 104 perpendicular to the axis 105. As shown in FIG. 9, the wavefront of beam 101 first reaches the scanned zone in the layer 103 and after an interval of time $\Delta t_1$ the scanned zone in the layer 104. Similarly, the wavefront of beam 102 first reaches the scanned zone in the layer 103 and after an interval $\Delta t_2$ the scanned zone in layer 104. It will be seen from FIG. 9 that the magnitudes of the time intervals $\Delta t_1$ and $\Delta t_2$ are dependent upon the angle that the ultrasound beams 101, 102 form with the axis 105. Since it is intended to display the cross-sectional picture on the screen of the television monitor 18, it being possible to display scanned zones only along the television lines, faithful reproduction of the geometric arrangement of the scanned zones in the scanned area of the body under examination necessitates the use of an angle-dependent scanning frequency.

Figure 13:
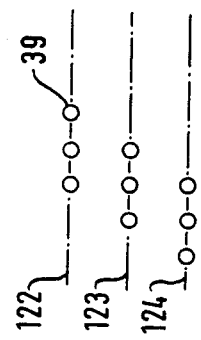
FIG. 13 is a diagram of a picture that can be produced on a television monitor screen by means of a scan.
Figure 11:
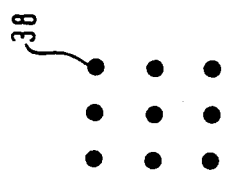
Figure 10:
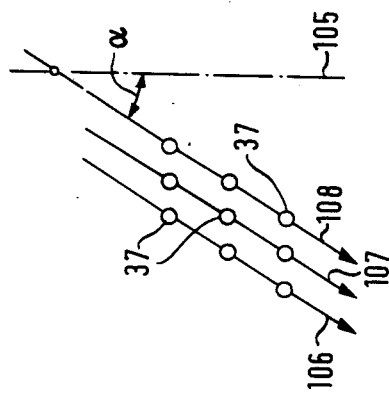
FIG. 10 is a schematic diagram which shows a scan with a plurality of ultrasound beams at a specific directional angle, FIGS. 11 and 12 schematically show two possible memory configurations in the units 341-348 of FIG. 4 which are used for storing the image signals.

Two possibilities in respect of storing the image signals in the main memory 34 will now be explained with reference to FIGS. 10-13. FIG. 10 shows the scanning of a body under examination at a given directional angle $\alpha$. In this case a number of scanned zones 37 is covered by ultrasound beams 106-108. FIG. 13 shows television lines 122-124 and image points 39 thereon each corresponding to a scanned zone 37 in FIG. 10. The image signals produced by the scan of FIG. 10 which correspond to the scanned zones 37 are digitized and stored in one of the memory units of the main memory 34. As shown diagrammatically in FIG. 11, the image signals can be stored in memory locations 38 whose geometric arrangement differs from that of the scanned zones 37 in FIG. 10 and is independent thereof. In that case the imaging system must be so arranged that the image signals are transferred from the memory unit to the evaluator 36 in a chronological arrangement such that the compound cross-sectional picture displayed on the screen as shown in FIG. 13 faithfully reproduces the geometric arrangement of the reflectors.

Figure 12:
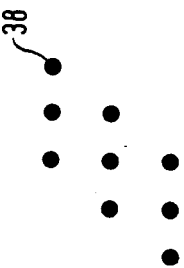

Another possibility in respect of storage of the image signals in one of the memory units of the main memory 34 is shown in FIG. 12. From this Figure it will be clear that the image signals are stored in memory locations 38 whose geometric arrangement corresponds to the arrangement of the scanned zones 37 in FIG. 10. In this case, no change of format is necessary on transmission of the image signals from the main memory 34 to the evaluator unit 36 in order that the compound cross-sectional picture displayed on the screen of the television monitor 18 may faithfully reproduce the geometric arrangement of the scanned zones 37.

Referring back to FIG. 1, the lower section thereof diagrammatically shows the ultrasound imaging system described here being used to scan the part of the body under investigation with a compound scanning pattern made up of a plurality of consecutive linear scans 1, 2, 3 at different directional angles. As shown diagrammatically in FIG. 14, in the exemplified embodiments described here, use is preferably made of a scanning pattern made up of eight such linear scans 131-138. In all these scans the transducer 114 has the same position with respect to the part of the body under examination. The scans 131-138 should therefore really be shown as in FIG. 1. However, in order that the different directional angles of the ultrasound beams 106 of these scans may be readily recognized, the scans 131-138 are displayed side by side in FIG. 14. Each of these scans is carried out by subjecting the part of the body under examination to ultrasound pulses emitted along 64 parallel beams (also referred to as scanning lines). The beam repetition time, i.e. the time between the emission of consecutive ultrasound pulses, is 256 microseconds. As already mentioned above, the scanning frequency is so selected that image signals for 512 pixels are obtained for each scanning line.

Figure 14:
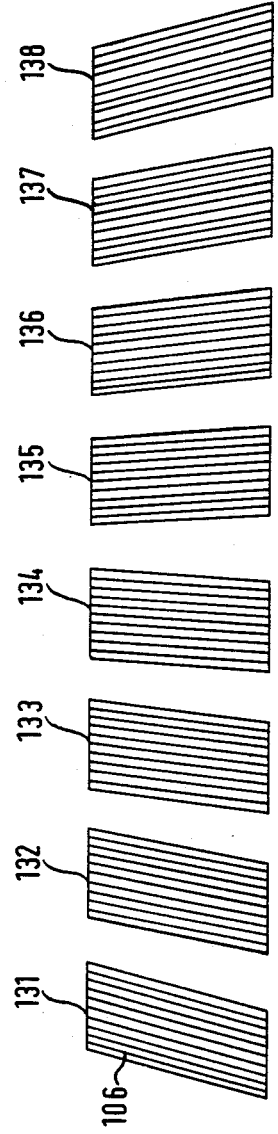
FIG. 14 is a schematic display of eight scanning zones scanned at eight different directional angles, FIG. 15 diagramatically shows the memory units 341-348 of FIG. 4 in which the image signals from the scanning zones 131-138 (in FIG. 14) are stored.
Figure 15:
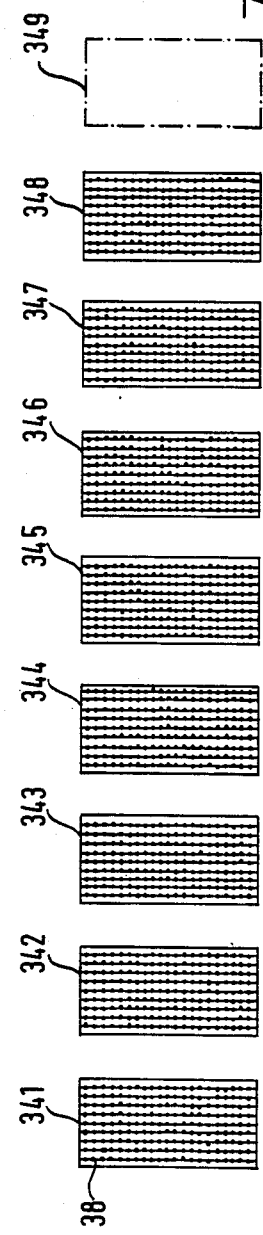

As shown in FIGS. 14 and 15, one exemplified embodiment of the invention provides for one of the memory units 341-348 of the main memory 34 in FIG. 4 to be used for the storage of image signals produced by each of the scans 131-138. It will be seen from FIGS. 14 and 15 that in the above-mentioned exemplified embodiment the number of scans 131-138 and the number of memory units 341-348 are the same. In a second embodiment of the invention, however, the number of memory units into which the main memory 34 is subdivided may be greater than the number of scans carried out with the imaging system for producing a compound cross-sectional picture. As shown in FIG. 15, the main memory may, for example, contain an additional memory unit 349.

As already explained above with reference to FIGS. 10-13, the image signals in each memory unit can be stored in an arrangement of memory locations whose geometric arrangement differs from the arrangement of scanned zones and is independent thereof, or in an arrangement of memory locations whose geometric arrangement corresponds to the arrangement of the scanned zones.

Figure 16:
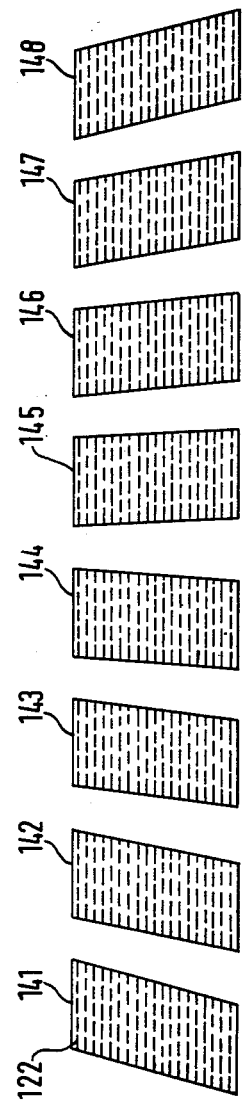
FIG. 16 is a diagram of eight television pictures each corresponding to a picture of one of the scanning zones 131-138 shown in FIG. 14.

FIG. 16 is a diagram showing eight television pictures 141-148 each representing a picture of the scanning areas 131-138 shown in FIG. 14. The pictures 141-148 are made up of television lines, each line representing image points stored in digital form in one line of memory locations 38 in one of the memory units 341-348 (in FIG. 15). However, it should be noted that the representation of individual television pictures 141-148 according to FIG. 16 is not the main object of this invention. In this specification a display of this kind is used only to explain the correspondence between image points of the television picture, memory locations in the main memory 34, and the scanned zones.

Figure 17:
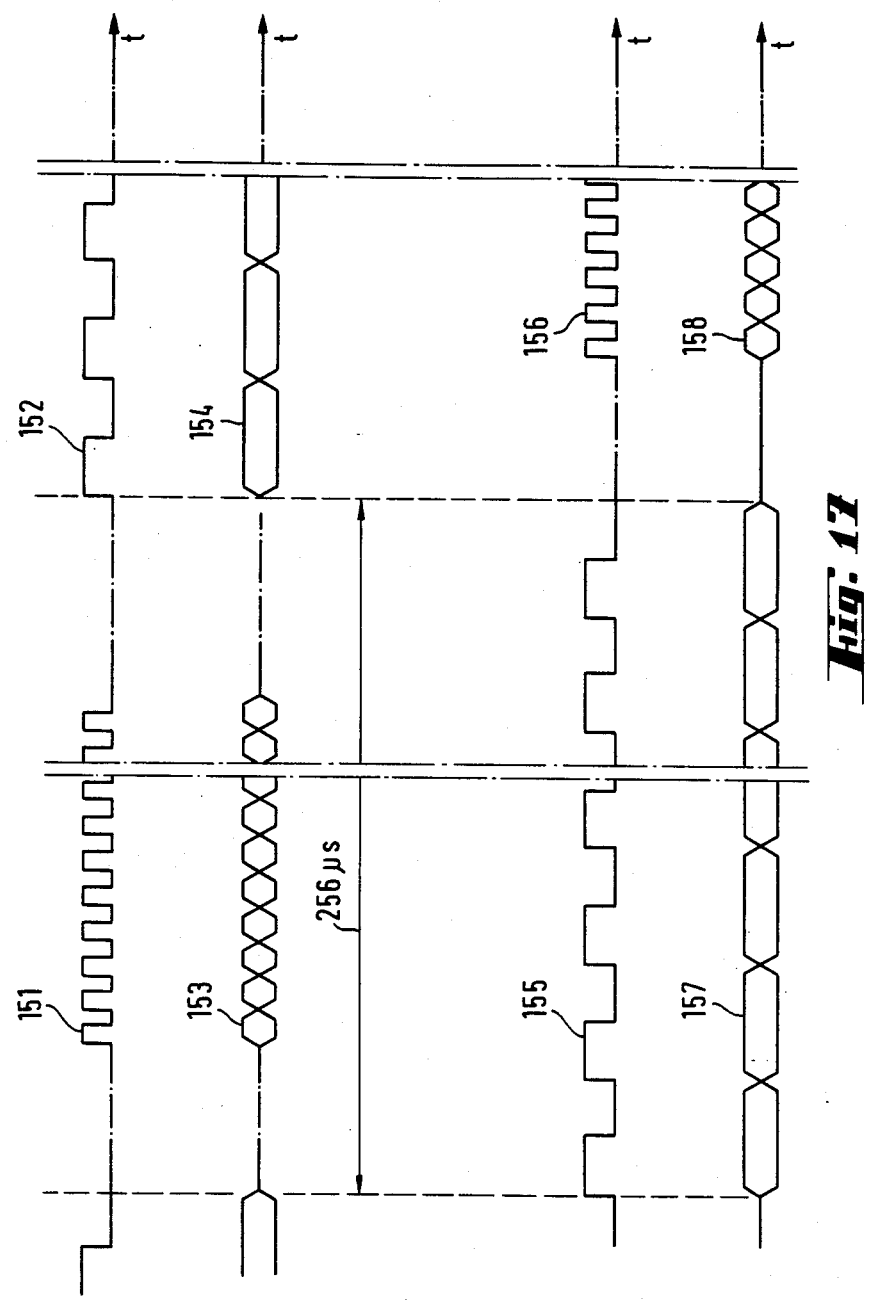
FIG. 17 is a time diagram of the write-in and readout operations in respect of the input buffer memory 31 in FIG. 4.

Referring now to FIGS. 5 and 17, the write-in and read-out operations will now be described in connection with the input buffer memory 31. In the position of the switches shown in FIG. 5, 512 digitalized amplitude values 153 are written into the memory unit 61 at an angle-dependent data rate greater than 2 MHz, for example within a period of 256 microseconds (beam repetition time). The clock signal 151 required for this write-in operation is fed to the memory unit 61 via line 66 and switch 68. In this way, 512 image signals are stored in the input buffer memory 31 per scanning line. As will be apparent from the bottom part of FIG. 17, during the same interval of 256 microseconds, 512 amplitude values 157 stored in the preceding 256 microseconds interval are read out of the memory unit 62 at a fixed data rate of, for example 2 MHz. The clock signal 155 required for the purpose is fed to the memory unit 62 via line 65 and switch 67. At the end of each 256 microsecond interval all the switches in FIG. 5 are changed over. As will be seen from FIG. 17, the clock signal 156 causes 512 new amplitude values 158 to be written into the memory unit 62 during the next 256 microsecond interval, while the clock signal 152 causes the read-out of the amplitude values 154 written into the memory unit 61 during the preceding 256 microsecond interval. The clock signals 151 and 156 have the same frequency and the same chronological position within the 256 microsecond time interval. The clock signals 155 and 152 have the same frequency and the same chronological position within the 256 microsecond time interval.

In accordance with the foregoing, therefore, the data rate of the 512 digitized image signals (amplitude values) per scanning line is transformed by means of the input buffer memory 31 to synchronize the writing of these image signals into the main memory 34 with a fixed memory control.

The write-in and read-out operations in respect of the memory units 341-348 of the main memory 34 in FIG. 4 will now be described with reference to FIGS. 4-6. The image signals read out of one of the memory units 61, 62 of the input buffer memory 31 for an entire scanning line (e.g. for scanning line 106 in FIG. 14) are fed via line 311 to the input of the demultiplexer 32 at a data rate of 2 MHz. In response to control signals fed to it via line 42, demultiplexer 32 feeds the image signals arriving at its input to one of the memory units 341-348 of the main memory 34.

In these conditions, the image signals arriving at a data rate of 2 MHz via line 311 are divided up into two sequences of image signals at a data rate of 1 MHz each. When the demultiplexer 32 delivers the image signals of memory unit 341, one of the trains of image signals is transmitted via line 321 to the memory sub-level 3411 (in FIG. 6), while the other train of image signals is fed simultaneously via line 322 to the memory sub-level 3412.

Image signals for image points which are taken into account in producing even-numbered and odd-numbered television lines in the compound cross-sectional picture are stored in the sub-level 3411 and 3412, respectively. In this way the image signals obtained with each scanning line of the scan 131 in FIG. 14 are written into a corresponding column of memory locations 38 in the memory unit 341 in FIG. 15.

The image signals obtained with the scans 132-138 are each written into the associated memory unit 342-348 by the same method. Because of the required television compatible display, the image signals stored in the memory units 341-348 are read out of horizontal lines of memory locations 38, one line of storage locations 38 being read out of each of the eight memory sub-levels 3411-3481. The contents of the memory sub-levels 3411-3481 are read out line-wise in this way. On completion of this operation, the contents of the eight memory sub-levels 3412-3482 are also read out line-wise. On completion of this operation the contents of the eight memory sub-levels 3411-3481 are again read out, and so on.

When the number of memory units 341-348 used in the main memory 34 and the number of scans 131-138 carried out to produce the compound cross-sectional picture as shown in FIG. 14 are identical, a memory cycle of 1 microsecond is provided for the write-in and read-out operations in respect of the memory units 341-348 and is divided into two cycles each of 500 ns. Thus in the first half of a memory cycle a pixel $Y_U$ and a pixel $Y_G$ are simultaneously written into the memory sub-levels 3411 and 3412 respectively, and in the second half of the same memory cycle one pixel $X_U$ is read out of each of the eight memory sub-levels 3421-3482, for example, simultaneously. When the picture produced on the screen of the television monitor 18 is to be held (frozen), the memory cycles are suppressed. The corresponding time intervals can then be used for direct access (read-in or write-out) via a microprocessor. This can access one of the memory units at any desired pixel. When the picture is not frozen, the write-in cycle is used continuously but the read-out cycle is used only during the time when the compound picture appears (on the screen of television monitor 18) within the time interval per television picture. The European television Standard is 625 lines, of which 512 are required for an ultrasound picture. One television line is produced within a time interval of 64 microseconds.

The image signals read simultaneously out of the memory sub-levels of the memory units 341-348 are fed via multiplexers 3413-3483 and via lines 461-468 to the output buffer memories 351-358.

The write-in and read-out operations in the output buffer memory 351 will now be described with reference to FIGS. 6-8 and 18. The write-in and read-out operations are carried out simultaneously in the same way in all eight output buffer memories 351-358.

When the switches 83, 84, 87 and 88 are in the position shown in FIG. 7, the image signals read out of one line of memory locations of one of the memory sub-levels 3411 or 3412 in FIG. 6 are fed to the shift register 81 via line 461 and switch 83. As will be seen from the time diagram in FIG. 18, this write-in operation is carried out within a 64 microsecond time interval defined by the interval between two consecutive synchronization pulses 161 for the television lines. During this interval the shift register 81 receives a clock signal 162 via line 86 and switch 88 to control the above-mentioned write-in operation to the shift register 81. In this way 64 image signals 163 are written into the shift register 81 with a data rate of 1 MHz. As will now be explained with reference to the time diagram in FIG. 18, the contents of the shift register 82 (in FIG. 7) in which image signals of the preceding line have been stored, are read out within the same time interval in which image signals were written into the shift register 81. This read-out operation is carried out at a data rate of about 4 MHz and with an angle-dependent and line-dependent delay 167. The duration of this read-out operation is determined by a pulse 171 which is also used as a read enabling pulse. The read-out of the shift register 82 is controlled by a clock signal 165 of about 4 MHz fed to the shift register via line 85 and switch 87. In this way 64 image signals 174 are read out of the shift register 82 and fed via switch 84 and line 471 to one input of the adding circuit 51 of the evaluator 36 in FIG. 8.

The above-described read-out operation gives two important effects. Firstly, the data rate of the read-out operation (about 8 MHz) allows a television compatible processing of the image signals in the evaluator 36.

Second, the above-mentioned delay, which is dependent upon the scanning line directional angle and upon the relative position of the respective corresponding television line has the effect that the cross-sectional picture displayed on the screen of the television monitor 18 faithfully reproduces the geometric arrangement of the scanned reflectors.

The pulse 171 defining the active read-out time from shift register 82 is delivered as a read enabling pulse by the programmable clock pulse generator 91 via line 481 (see FIG. 7). At the end of each 64 microsecond interval (see FIG. 18) all the switches in FIG. 7 are changed over. Thus in the next 64 microsecond interval image signals are written into the shift register 82 and the contents of the shift register 81 are read out.

The above-mentioned delay during the read-out operation from the output buffer memory 351 is not necessary if the main memory is used to store image signals in storage locations where geometric arrangement corresponds to the geometric arrangement of the scanned zones.

The signal processing in the evaluator 36 will now be described with reference to FIGS. 8 and 19. The image signals read out of the eight output buffer memories 351–358 are fed via lines 471–478 to corresponding inputs of the adding circuit 51. Corresponding read enabling pulses delivered by the output buffer memories 351–358 via the lines 481–488 are fed to the inputs of adding circuit 52. The summation signals formed in this way in the adding circuits 51, 52 are fed to corresponding inputs of the quotient forming circuit 53. Thus an image signal (amplitude value) corresponding to the arithmetic mean of 1–8 image signals is produced at the output of the quotient forming circuit 53 for each point of the compound cross-sectional picture displayed on the screen of the television monitor 18. The output signal of the quotient forming circuit is converted by digital-analog converter 54 into an analog signal fed to one of the inputs of the mixer circuit 55 where it is mixed with the synchronization signal arriving via line 551. The output signal of the mixer circuit 55 is fed via line 361 to the television monitor 18.

Figure 19:
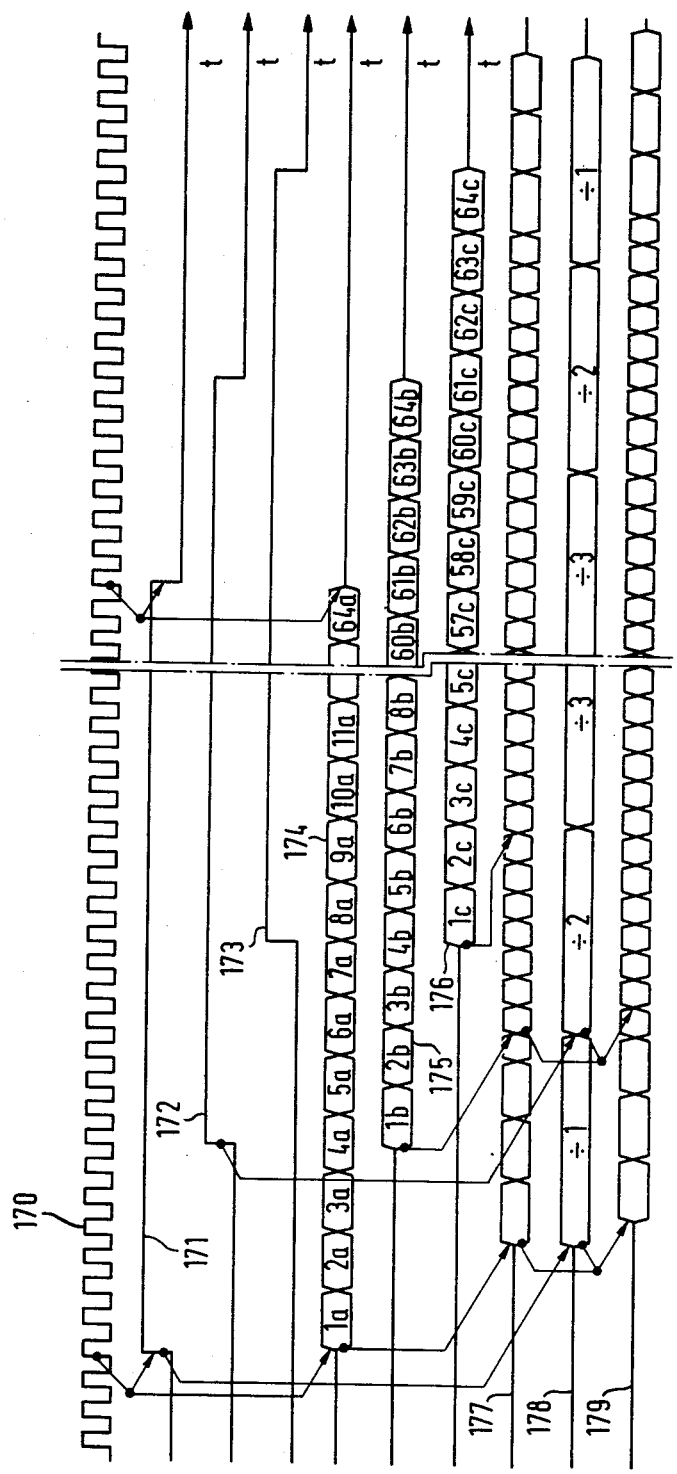
FIG. 19 is a time diagram of the signal processing in the evaluator unit 36 in FIGS. 4 and 8.

The time diagram in FIG. 19 diagrammatically illustrates the signal processing in the evaluator 36 for signals delivered by 3 out of the 8 output buffer memories 351–358. The top line of FIG. 19 shows a clock signal 170 which controls the signal processing. Beneath it are three read enabling signals 171–173 and the groups of 64 digital image signals 174: (1a, 2a, ..., 64a); 175: (1b, 2b, ..., 64b) and 176: (1c, 2c, ... 64c) each corresponding to one of the read enabling pulses. FIG. 19 also shows the summation signal 177 at the output of the adding circuit 51, the summation signal 178 at the output of the adding circuit 52 and the output signal 179 of the quotient forming circuit 53.

Figure 18:
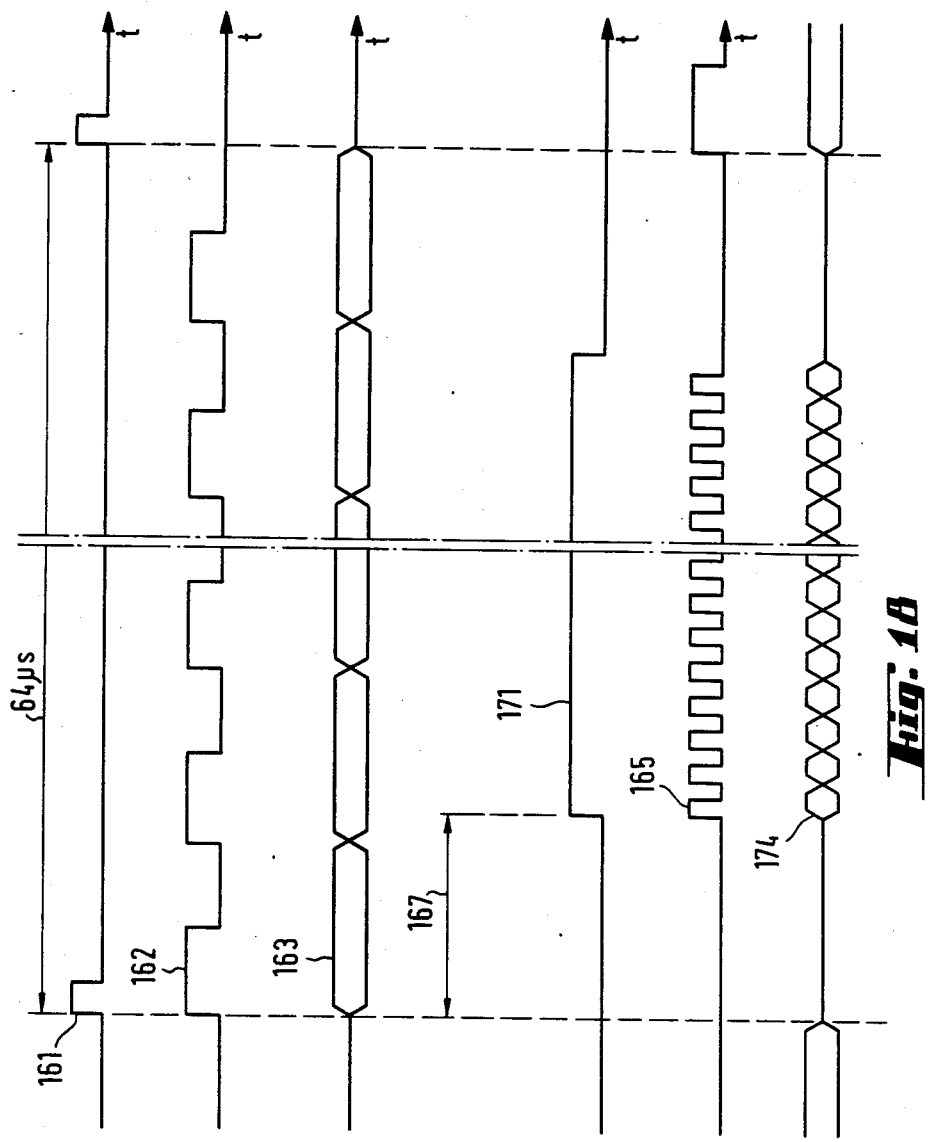
FIG. 18 is a time diagram of the write-in and readout operations in respect of one of the output buffer memories 351-358 in FIG. 4.

The clock signal 170 in FIG. 19 has a frequency equal to twice the frequency of the clock signal 165 in FIG. 18. Consequently, during signal processing in evaluator 36 the contents of each memory locations of main memory 34 are taken into account in producing the image signals for each two pixels on the screen of the television monitor 18. This frequency ratio between the clock signals 170 and 165 is advantageous when the image signals are stored in locations in the main memory 34 whose geometric arrangement differs from that of the scanned zones. Otherwise it is advantageous to use clock signals 170 and 165 which have the same frequency.

Using a suitable design of evaluator 36, the peak, minimal or median value of the corresponding image signals stored in the main memory 34 and representing different echoes from one and the same scanned zone may be formed to produce each image signal of the compound cross-sectional picture. A combination of at least two such values can also be used for this purpose.

In the above-described image signal memory 117 in FIG. 4 six bits are always used per memory location. After division in the quotient forming circuit 53 eight significant bits are used in the evaluator 36 for digital-analog conversion.

The image repetition frequency of the compound cross-sectional picture shown on the screen of television monitor 18 is calculated as follows: 256 microseconds are required for the scanning of a scanning line. For eight scans each having 64 scanning lines, therefore, 131 milliseconds are required. Consequently the image repetition frequency is about 7.6 images per second. It will be seen from this that a new partial picture obtained by one of the eight scans is produced every 16 milliseconds.

In one advantageous embodiment of the image signal memory 117 the main memory 34 comprises a number of memory units one larger than the number of scans carried out with the ultrasound imaging system to produce the compound cross-sectional picture. If, for example, the system employs eight scans 131–138 as shown in FIG. 14, the main memory 34 contains nine memory units 341–349. In this embodiment, the image signal memory 117 is so arranged that for the entire period of each of the scans the resulting image signals are optionally written into one of the memory units 341–349 and in the same interval the image signals stored in the other memory units are read out to produce a compound real-time cross-sectional picture, while in the next scan the resulting image signals are written into the memory unit containing the oldest image information in the image signal memory at the start of that scan.

Figure 20:
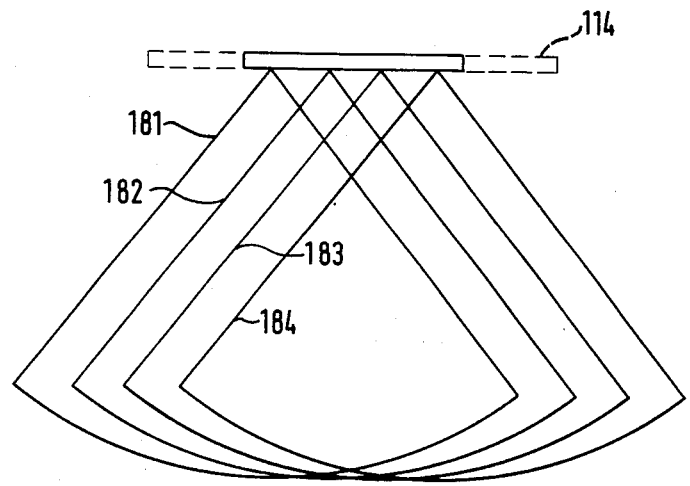
FIG. 20 is a diagram showing four sector scans carried out with the transducer array 114 of FIGS. 1-3.

The above description of exemplified embodiments is based on the part of the body under examination being scanned with a scanning pattern of the kind shown in FIG. 1. However, the use of this invention is not restricted to such scanning patterns. It can, for example, also advantageously be used when the transducer array 114 is used to produce a sequence of partially overlapping sector scans 181–184 as shown in FIG. 20. Nor need such sector scans necessarily be carried out with the above-described transducer array 114 since they can also be carried out with an oscillating or rotating transducer system. Details of the construction and function of such transducer systems are provided in the previously cited patent applications No. 779,189 entitled "Ultrasonic Compound Scan with an Oscillating Transducer" and No. 779,187 entitled "Ultrasonic Compound Scan with a Rotating Transducer".

We claim:

1. A method for producing a compound ultrasound cross-sectional picture of a body, in which method a plurality of consecutive, partially overlapping body scans are carried out in rapid succession and line-wise by the pulse-echo method in one scanning plane thereby producing image signals corresponding to the received echoes which are then converted to digital form, comprising:

(a) storing the set of image signals corresponding to an individual picture produced with each scan in a distinct digital storage unit allocated to that set, (b) simultaneously reading from at least some of the storage units image signals which correspond to one and the same reflector within the body, and successively reading such signals for a set of reflectors within a scanned area in the scanning plane, (c) combining said simultaneously read image signals with one another to form a resulting image signal for each scanned reflector and thereby generating a new set of image signals corresponding to a compound picture of the scanned area, (d) said reading and combining of image signals being effected at such a rate that the signals of the new set of image signals are generated at a rate compatible with television standards for the processing of video signals, and (e) transmitting the new set of image signals to a television monitor at said rate in order to display the compound picture.

2. An image signal processing unit for use in an ultrasound imaging system for producing a compound ultrasound cross-sectional picture of a body, and wherein a plurality of consecutive, partially overlapping body scans are carried out in rapid succession and line-wise in one scanning plane by the pulse echo process to produce image signals in digital form corresponding to the received echoes, which system includes an ultrasound scanner, a transceiver unit connected thereto, a television monitor, a transducer connector, and a control unit connected to the transceiver unit, to the transducer connector and to the television monitor, and wherein:

(a) said image processing unit is connected between the transceiver unit and the television monitor and comprises:

(b) a digital image signal memory connected to the transceiver unit and comprising a main memory subdivided into a plurality of memory units, each memory unit having a data input and a data output and a memory capacity sufficient for accommodating a set of image signals corresponding to a picture obtained by a single one of the imaging system scans, (c) an evaluator connected between the output of the image signal memory and the television monitor for combining with one another at least some of the sets of image signals stored in the image signal memory so as to produce a new set of image signals corresponding to a compound picture of a scanned area in the scanning plane, the image signals being combined corresponding to echos from one and the same reflector within the body, the combining of the image signals being effected at a rate such that successive compound pictures have a standard television image frequency, and for transmitting the new set of image signals to the television monitor at that rate, and (d) electrical connecting means for connecting the image signal memory and the evaluator to the control unit of the imaging system.

3. The image signal processing unit according to claim 2 in which the image signal memory comprises:

(a) a first buffer memory for receiving the image signals, which buffer memory has a data input and a data output and the data input of which is connected to the transceiver unit via an analog-digital converter, (b) a demultiplexer optionally connecting the data output of said first buffer memory to the data input of one of the memory units of the main memory in response to control signals, (c) a plurality of second buffer memories for receiving the image signals to be transferred from the memory units of the main memory to the evaluator, each second buffer memory having a data input and data output, the data input of each second buffer memory being connected to the data output of one of said memory units, and the data output of each second buffer memory being connected to one input of said evaluator, and (d) electrical connecting means for connecting the first buffer memory, the demultiplexer, each of the memory units of the main memory and each second buffer memory to the control unit.

4. An image signal processing unit according to claim 3 in which the image signals are mapped in the memory units of the main memory independently of the geometric arrangement of the scanned zones producing the echoes corresponding to the image signals, and wherein the image signals are transferred from the memory units to the evaluator in a chronological arrangement such that the compound cross-sectional picture faithfully reproduces the geometric arrangement of the scanned zones.

5. An image signal processing unit according to claim 3 in which the image signals are mapped in the memory units of the main memory in a configuration which corresponds to the geometric arrangement of the scanned zones producing the echoes corresponding to the image signals.

6. An image signal processing unit according to claim 3 in which the number of memory units into which the main memory is subdivided is larger than the number of scans carried out with the imaging system in order to produce a compound cross-sectional picture.

7. An image processing unit according to claim 6 in which the image signal memory is so configured and controlled that during the entire period of each of the scans, the image signals produced are optionally written into one of the memory units and in the same time interval the image signals stored in the other memory units are read out to produce a compound real-time cross-sectional picture, while in the next scan the resulting image signals are written into the memory unit containing the oldest image information stored in the image signal memory at the beginning of that scan.

8. An image signal processing unit according to claim 2 in which the image signals are mapped in the memory units of the main memory independently of the geometric arrangement of the scanned zones producing the echoes corresponding to the image signals, and wherein the image signals are transferred from the memory units to the evaluator in a chronological arrangement such that the compound cross-sectional picture faithfully reproduces the geometric arrangement of the scanned zones.

9. An image signal processing unit according to claim 2 in which the image signals are mapped in the memory units of the main memory in a configuration which corresponds to the geometric arrangement of the scanned zones producing the echoes corresponding to the image signals.

10. An image signal processing unit according to claim 2 in which the number of memory units into which the main memory is subdivided is larger than the number of scans carried out with the imaging system in order to produce a compound cross-sectional picture.

11. An image processing unit according to claim 10 in which the image signal memory is so configured and controlled that during the entire period of each of the scans, the image signals produced are optionally written into one of the memory units and in the same time interval the image signals stored in the other memory units are read out to produce a compound real-time cross-sectional picture, while in the next scan the resulting image signals are written into the memory unit containing the oldest image information stored in the image signal memory at the beginning of that scan.

12. An image processing unit according to claim 2 in which alternate read and write cycles are provided for each memory unit of the main memory, the duration and alternating frequency of which are so selected that all the image signals produced by the scans can be stored and all the image signals required for a real-time display of the compound cross-sectional picture can be read.

13. An image processing unit according to claim 2 or 3 or 8 or 4 or 9 or 5 or 10 or 6 or 11 or 7 or 12 in which the evaluator comprises means with which a new set of image signals corresponding to a compound cross-sectional picture can be derived from sets of image signals stored in the memory units of the main memory, each image signal of the new set corresponding to the average, peak, minimal or median value—or a combination of at least two of these values—of image signals representing different echoes from one and the same reflector.

14. An ultrasound imaging system for producing ultrasound cross-sectional pictures of a body, to achieve a pluality of partially overlapping body scans carried out line-wise in one scanningg plane by the pulse echo process in order to produce image signals in digital form corresponding to the received echoes, which system comprises an ultrasound scanner, a transceiver unit connected thereto, a television monitor, a transducer connector system and a control unit connected to the transceiver unit, the transducer connector system and the television monitor, characterized in that said system comprises an image signal processing unit according to claim 2 or 3 or 4 or 5 or 6 or 7 or 8 or 9 or 10 or 11 or 12 which is connected between the transceiver unit and the television monitor.

15. An image processing unit according to claim 2 or 3 or 8 or 4 or 9 or 5 in which alternate read and write cycles are provided for each memory unit of the main memory, the duration and alternating frequency of which are so selected that all the image signals produced by the scans can be stored and all the image signals required for a real-time display of the compound cross-sectional picture can be read.

* * * * *